(12) United States Patent
Ehara et al.

(10) Patent No.: US 12,469,938 B2
(45) Date of Patent: Nov. 11, 2025

(54) METHOD FOR PRODUCING POWER STORAGE DEVICE (71) Applicants: Prime Planet Energy & Solutions, Inc., Tokyo (JP); TOYOTA JIDOSHA KABUSHIKI KAISHA, Aichi-ken (JP); PRIMEARTH EV ENERGY CO., LTD., Shizuoka-ken (JP)

(72) Inventors: Tsuyoshi Ehara, Toyota (JP); Yozo Uchida, Toyota (JP); Yuki Sato, Toyota (JP); Syoichi Tsuchiya, Toyota (JP); Masataka Asai, Toyota (JP); Tsuyoshi Asano, Toyota (JP); Masahiro Uchimura, Toyota (JP); Shigeru Matsumoto, Toyohashi (JP); Yasuaki Nagano, Kosai (JP)

(73) Assignees: PRIME PLANET ENERGY & SOLUTIONS, INC., Tokyo (JP); TOYOTA JIDOSHA KABUSHIKI KAISHA, Aichi-Ken (JP); TOYOTA BATTERY CO., LTD., Shizuoka-Ken (JP)

(*) Notice: Subject to any disclaimer, the term of this patent is extended or adjusted under 35 U.S.C. 154(b) by 148 days.

(21) Appl. No.: 18/484,449

(22) Filed: Oct. 11, 2023

(65) Prior Publication Data
US 2024/0170814 A1 May 23, 2024

(30) Foreign Application Priority Data
Nov. 21, 2022 (JP) .................... 2022-185481

(51) Int. Cl.
B29C 45/14 (2006.01)
H01M 50/103 (2021.01)
(Continued)

(52) U.S. Cl.
CPC ..... *H01M 50/564* (2021.01); *B29C 45/14008* (2013.01); *B29C 45/14311* (2013.01);
(Continued)

(58) Field of Classification Search
CPC .............. B29C 45/14; B29C 45/14122; B29C 45/14139; B29C 45/1418;
(Continued)

(56) References Cited

U.S. PATENT DOCUMENTS 3,919,371 A * 11/1975 Jache .................. B29C 45/14
264/54
10,123,465 B2 * 11/2018 Lei ..................... H05K 7/20927
(Continued)

FOREIGN PATENT DOCUMENTS

JP 2010-055992 A 3/2010
JP 2010-272324 A 12/2010
(Continued)

*Primary Examiner* — Thu Khanh T. Nguyen
(74) *Attorney, Agent, or Firm* — HAUPTMAN HAM, LLP (57) ABSTRACT A method for producing a power storage device includes an insert-molding step of making a resin member by insert-molding with respect to a terminal member inserted in an insertion hole of a lid. In this insert-molding step, the insertion hole of the lid is placed in front of a gate, and a molten resin is injected through the gate to flow in an opposite gate-side space in a cavity through the insertion hole, allowing the molten resin to spread over the entire cavity, to form the resin member.

5 Claims, 8 Drawing Sheets (51) Int. Cl.
*H01M 50/15* (2021.01)
*H01M 50/176* (2021.01)
*H01M 50/557* (2021.01)
*H01M 50/564* (2021.01)
*B29K 81/00* (2006.01)
*B29L 31/00* (2006.01)
*B29L 31/34* (2006.01)

(52) U.S. Cl.
CPC ..... *B29C 45/14467* (2013.01); *H01M 50/103* (2021.01); *H01M 50/15* (2021.01); *H01M 50/176* (2021.01); *H01M 50/557* (2021.01); *B29C 2045/14327* (2013.01); *B29K 2081/04* (2013.01); *B29L 2031/3468* (2013.01); *B29L 2031/7146* (2013.01)

(58) Field of Classification Search
CPC ........ B29C 45/14344; B29C 45/14336; B29C 45/14352; B29C 45/14819; B29C 45/2628; B29C 2045/14967; B29C 2045/17975
See application file for complete search history.

(56) References Cited

U.S. PATENT DOCUMENTS

2014/0302381 A1    10/2014  Song et al.
2017/0222194 A1*   8/2017   Kajita ................ B29C 45/1615

FOREIGN PATENT DOCUMENTS

| JP | 2014-203825 A | 10/2014 |
| JP | 2016-001537 A | 1/2016 |
| JP | 2018-097978 A | 6/2018 |
| JP | 2021-086813 A | 6/2021 |

* cited by examiner

METHOD FOR PRODUCING POWER STORAGE DEVICE

CROSS-REFERENCE TO RELATED APPLICATIONS

This application is based upon and claims the benefit of priority to Japanese Patent Application No. 2022-185481 filed on Nov. 21, 2022, the entire contents of which are incorporated herein by reference.

BACKGROUND

Technical Field

The present disclosure relates to a method for producing a power storage device, such as a battery or a capacitor, in which a terminal member is fixed via a resin member to a case member that constitutes a part of a case.

Related Art

As a power storage device, there is known a rectangular battery in which positive and negative terminal members are each fixed to a case having a rectangular parallelepiped box-like shape via an insert-molded resin member. Specifically, the case is composed of: a bottomed rectangular tube-shaped case body having a rectangular ring-shaped opening portion; and a rectangular plate-shaped lid which is joined to the case body over the entire circumference thereof to close the opening portion. In addition, the positive and negative terminal members are inserted individually in a pair of insertion holes provided in the lid, and extend from the inside to the outside of the case. A pair of resin members are joined to the lid and the terminal members, while insulating between the lid and the terminal members, to fix the terminal members to the lid.

Such a battery is assembled by the following method. Specifically, the positive and negative terminal members are inserted individually into the insertion holes of the lid. In this state, the resin members are made by insert-molding to integrate the terminal members with the lid via the resin members, forming a lid assembly. Subsequently, the positive and negative terminal members of this lid assembly are respectively connected to positive and negative current collecting portions of the electrode body. Then, this electrode body is inserted into the case body, and the opening portion of the case body is closed with the lid, and laser-welding is performed on the entire circumference thereof to complete the case. Examples of a related conventional art are disclosed in Japanese unexamined patent application publications Nos. 2010-272324 (JP2010-272324 A) and 2018-097978 (JP2018-097978 A) (see FIGS. 1 and 2 of JP2010-272324 A and FIGS. 1 to 3 of JP2018-097978 A).

SUMMARY

Technical Problems

However, when the lid (i.e., the case member) is located in front of, i.e., at a position facing, a gate of a molding mold during the insert-molding, molten resin injected through the gate into a cavity impinges on the lid (i.e., the case member), and thus the molten resin is not allowed to smoothly spread over the entire cavity. When the resin pressure of the molten resin is low, that is, if the molten resin is injected at a low pressure, consequently, air bubbles may be generated inside the formed resin member. In contrast, when the resin pressure of the molten resin is set higher, that is, if the molten resin is injected at a higher resin pressure to prevent the generation of air bubbles, some portions of the lid (i.e., the case member) contacting with the molten resin may be deformed.

The present disclosure has been made in view of such circumstances, and provides a method for producing a power storage device, in which a resin member fixing a terminal member to a case member while insulating between them contains no air bubbles therein and also the case member has not been deformed.

Means of Solving the Problems (1) To achieve the above purpose, one aspect of the present disclosure provides a method for producing a power storage device, the power storage device including: a case member including an insertion hole; a terminal member inserted in the insertion hole of the case member; and a resin member joined to the case member and the terminal member while insulating between the case member and the terminal member, to fix the terminal member to the case member, the method comprising: insert-molding the resin member in a state where the terminal member is inserted in the insertion hole of the case member, wherein insert-molding the resin member is performed using a molding mold by: placing the insertion hole of the case member in front of a gate through which molten resin is injected into a cavity defined by the case member, the terminal member, and the molding mold; and injecting the molten resin through the gate into the cavity, so that the molten resin flows, through the insertion hole, to an opposite gate-side space located on an opposite side from the gate relative to the case member, and spreads over the entire cavity to form the resin member.

In this method for producing a power storage device, in the insert-molding process, the insertion hole of the case member is disposed in front of, that is, at the front position facing, the gate of the molding mold, and the molten resin is injected through the gate into the cavity, flowing through the insertion hole to the opposite gate-side space in the cavity, thus spreading over the entire cavity. This method configured as above can smoothly distribute the molten resin throughout the cavity. Even when the resin pressure for injecting the molten resin is set low, the resin member can be formed without internally containing air bubbles. Meanwhile, since the resin pressure can be set low, this can prevent deformation of the case member. This method can therefore produce a power storage device with the resin member containing no air bubbles therein and the case member having been undeformed.

(2) In the method described in (1), the insertion hole includes: an insertion part in which the terminal member is inserted; and a cutout extending from the insertion part, and insert-molding the resin member is performed by placing the cutout of the insertion hole in the front of the gate.

In some cases, a resin member is desired to be as small in size as possible in view of the design of a power storage device, and therefore an insertion hole also has to be minimized. According to the method described above, the insertion hole includes the insertion part through which the terminal member is inserted and the cutout extending, i.e., protruding, from a part of the insertion part. Therefore, the insertion hole can be reduced in size as compared to an insertion hole whose overall shape is rectangular, elliptic, or the like, and hence the resin member can be formed with a reduced size. Even for such small insertion hole and resin member, this method can produce a power storage device with the resin member containing no air bubbles and the case member having not been deformed.

(3) In the method described in (1) or (2), the terminal member includes a terminal outer flat-plate portion located outside the case member, the terminal outer flat-plate portion having a flat plate shape and including a planar terminal top surface, which is exposed outside, and the resin member includes a resin outer frame portion located outside the case member and formed in a frame shape that surrounds an outer periphery of the terminal outer flat-plate portion of the terminal member and is flush with the terminal top surface of the terminal outer flat-plate portion.

When the power storage device includes the terminal member including the terminal top surface and the resin member including the resin outer frame portion as described above, during the insert-molding, a part of the molten resin supplied around the terminal outer flat-plate portion in order to form the resin outer frame portion may further flow in between the terminal top surface of the terminal outer flat-plate portion and the molding mold, resulting in resin burrs on the terminal top surface after the insert-molding.

In the foregoing method, however, the resin pressure can be set low as described above. This can prevent a part of molten resin supplied around the terminal outer flat-plate portion from further flowing between the terminal top surface of the terminal outer flat-plate portion and the molding mold. Furthermore, the molten resin that has flowed into the opposite gate-side space in the cavity then flows in under the terminal undersurface of the terminal outer flat-plate portion, pushing the terminal undersurface to press the terminal outer flat-plate portion against the molding mold, causing the terminal top surface to tightly contact the molding mold. This can effectively prevent the molten resin from flowing in between the molding mold and the terminal top surface.

DETAILED DESCRIPTION OF THE EXEMPLARY EMBODIMENTS

Figure 1:
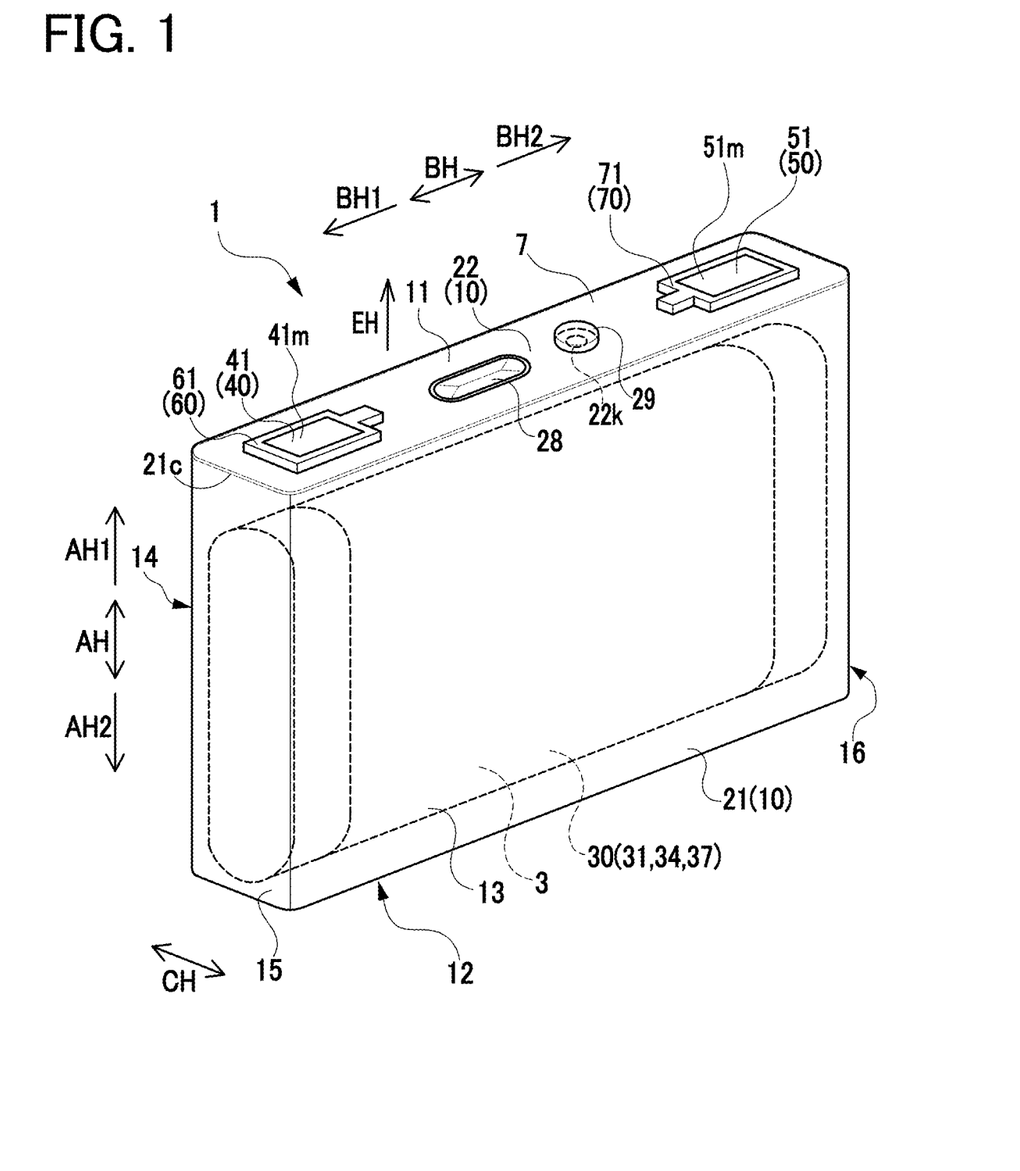
FIG. 1 is a perspective view of a battery in an embodiment.
Figure 2:
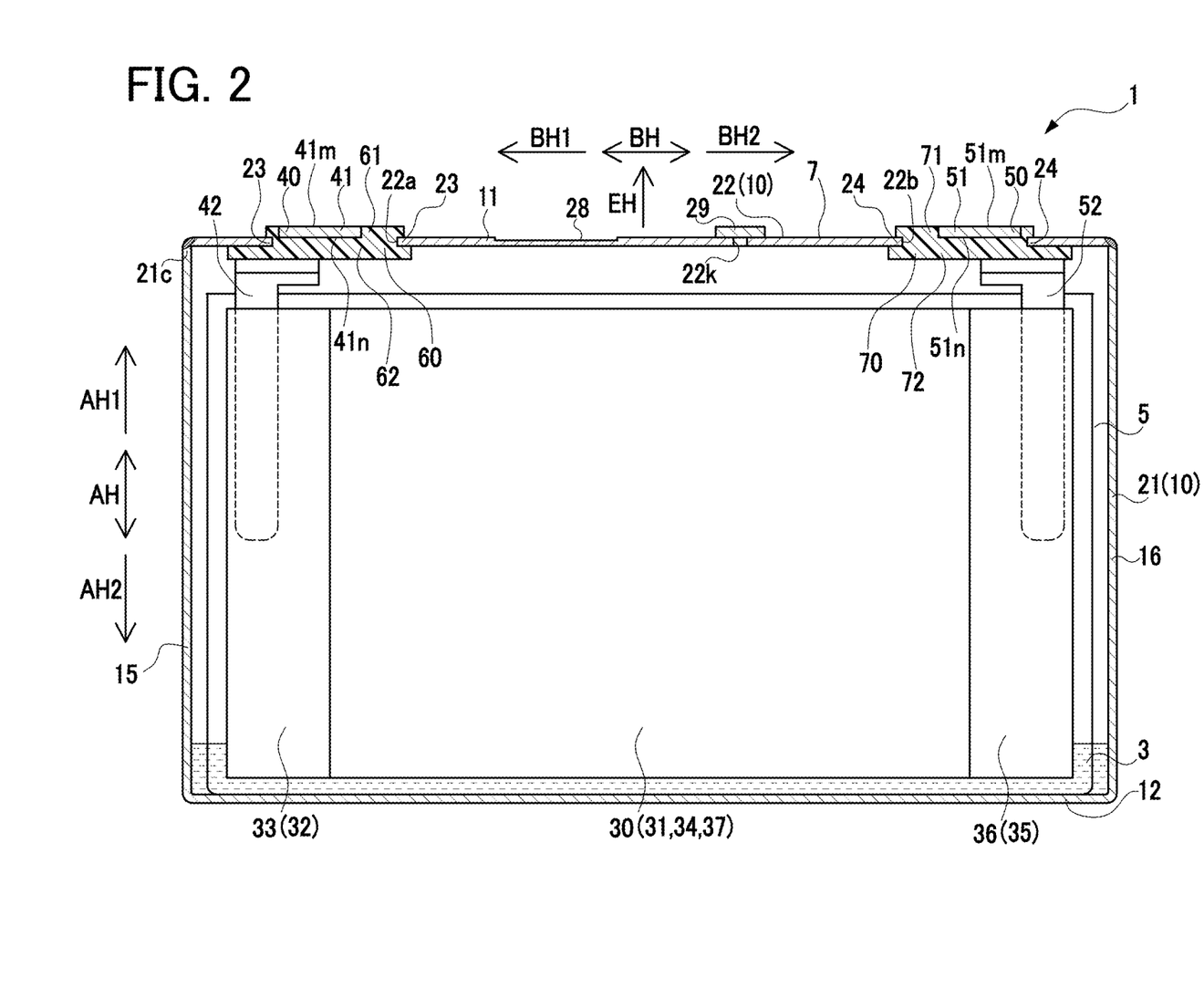
FIG. 2 is a cross-sectional view of the battery in the embodiment, taken along a battery height direction and a battery width direction.
Figure 3:
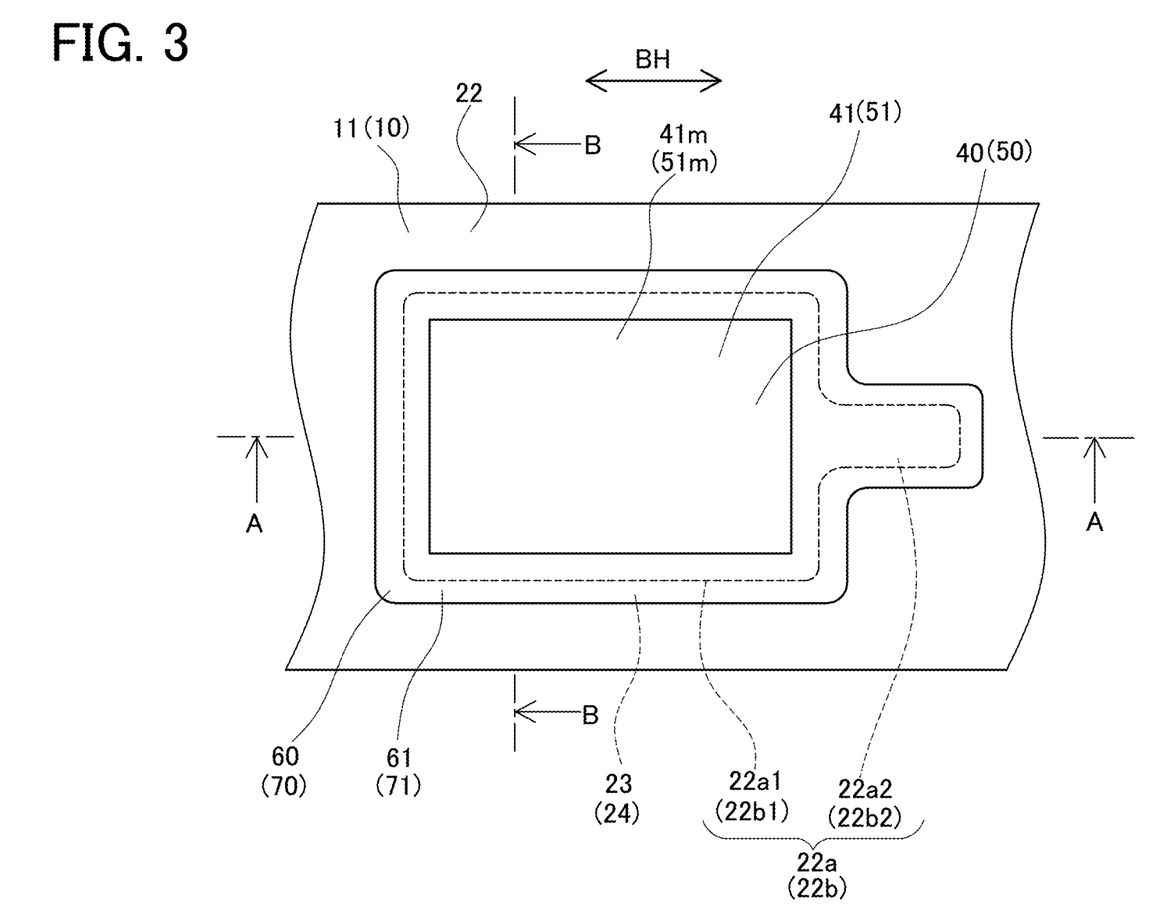
FIG. 3 is a partially enlarged top view of a terminal member and a resin member of the battery, and their surroundings in the embodiment.
Figure 4:
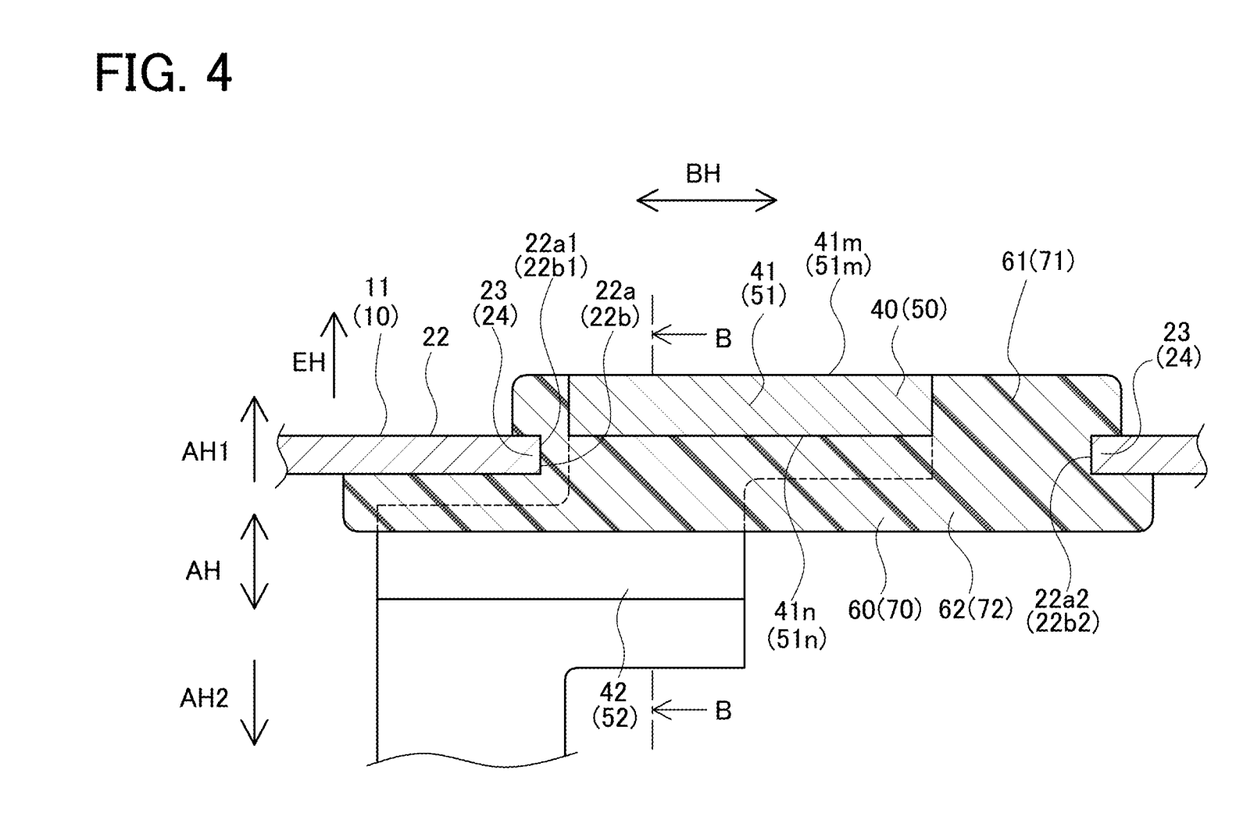
FIG. 4 is a cross-sectional view of the terminal member and the resin member of the battery, and their surroundings in the embodiment, as seen in a direction indicated by arrows A-A in FIGS. 3 and 5.
Figure 5:
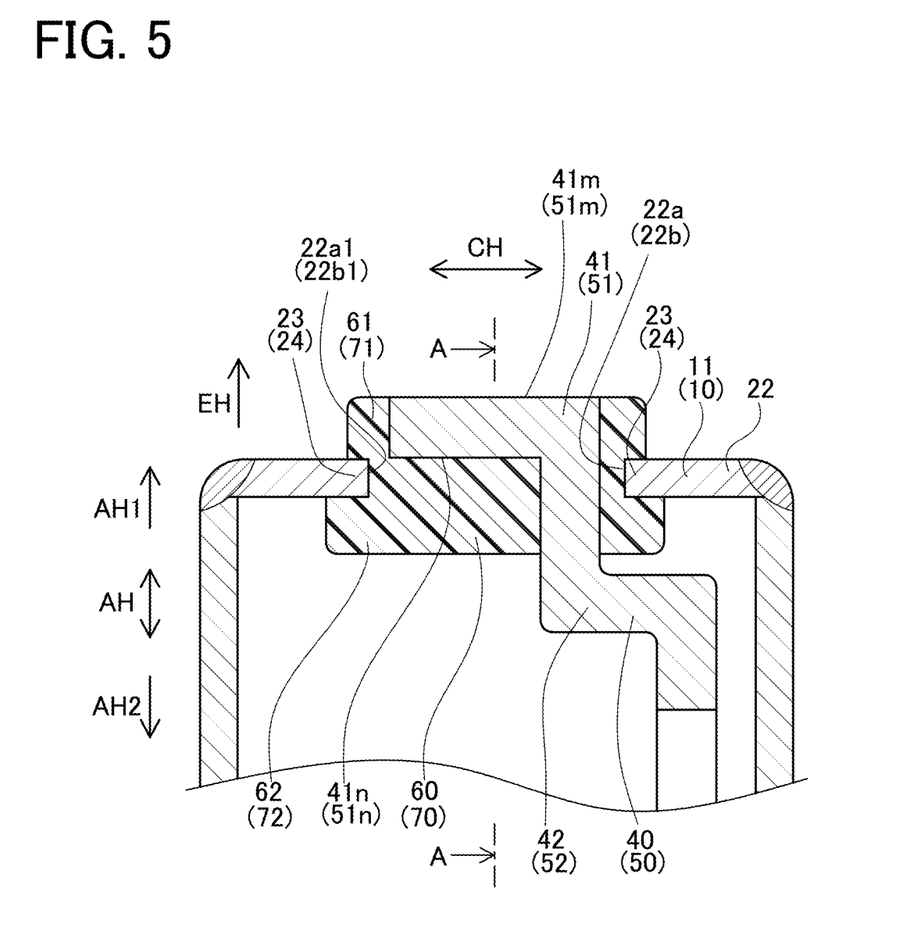
FIG. 5 is a cross-sectional view of the terminal member and the resin member of the battery, and their surroundings in the embodiment, as seen in a direction indicated by arrows B-B in FIGS. 3 and 4.

Hereinafter, an embodiment of the present disclosure will be described with reference to the accompanying drawings. FIG. 1 shows a perspective view of a battery (one example of a power storage device of the present disclosure) 1 of the present embodiment, and FIG. 2 shows a cross-sectional view of the battery 1. FIG. 3 shows a partially enlarged top view of a terminal member 40 and a resin member 60, and their surroundings. FIGS. 4 and 5 are partially enlarged cross-sectional views of the terminal member 40 and the resin member 60, and their surroundings. In the following, a description will be given with a battery height direction AH, a battery width direction BH, and a battery thickness direction CH of the battery 1 being defined as directions shown in FIGS. 1 to 5. The battery 1 is a rectangular, i.e., rectangular parallelepiped-shaped, sealed lithium-ion secondary battery which will be installed in a vehicle, such as a hybrid car, a plug-in hybrid car, and an electric car.

The battery 1 includes a case 10, a flat wound electrode body 30 housed in the case 10, a positive terminal member 40 and the negative terminal member 50 supported on a case upper portion 11, i.e., a lid 22, of the case 10, and others. In the case 10, the electrode body 30 is covered with a bag-shaped insulating holder 5 formed of an insulating film, opening on an upper side AH1 in the battery height direction AH. In addition, the case 10 contains therein an electrolyte 3, a part of which is impregnated in the electrode body 30 and the remaining part of which is accumulated on a case bottom portion 12 of the case 10.

The case 10 is made of a metal (e.g., aluminum in the present embodiment) and has a rectangular parallelepiped box-like shape. This case 10 includes the rectangular case upper portion 11 located on the upper side AH1 in the battery height direction AH, the rectangular case bottom portion 12 opposite the case upper portion 11 and located on a lower side AH2 in the battery height direction AH, and four rectangular case side portions 13, 14, 15, and 16 connecting these portions 11 and 12. Specifically, the case 10 includes: a bottomed rectangular tube-shaped case body 21 including a rectangular ring-shaped opening portion 21c on the upper side AH1; and the rectangular plate-shaped lid (one example of a case member of the present disclosure) 22 laser-welded to the case body 21 over the entire circumference thereof to close the opening portion 21c.

The case upper portion 11 (i.e., the lid 22) is provided with a safety valve 28 which will break open when the internal pressure of the case 10 exceeds a valve opening pressure. The lid 22 is also provided with a liquid inlet 22k which communicates between the inside and the outside of the case 10, and the liquid inlet 22k is hermetically sealed with a disc-shaped sealing member 29 made of aluminum.

Furthermore, the lid 22 is provided with two rectangular insertion holes 22a and 22b, which are located near an end on one side BH1 and near an end on another side BH2 in the battery width direction BH, respectively. The insertion hole 22a includes a rectangular insertion part 22a1 and a cutout 22a2 extending from this insertion part 22a1, and similarly, the insertion hole 22b includes a rectangular insertion part 22b1 and a cutout 22b2 extending from this cutout 22a2. Specifically, the cutout 22a2 of the insertion hole 22a on one side extends from the center of the insertion part 22a1 in the battery thickness direction toward the other side BH2, and the cutout 22b2 of the insertion hole 22b on the other side extends from the center of the insertion part 22b1 in the battery thickness direction toward the one side BH1.

In the insertion part 22a1 of the insertion hole 22a on one side, the positive terminal member 40 made of aluminum is inserted, and it is fixed to the lid 22 via the resin member 60 insulating the positive terminal member 40 from the case 10. In addition, in the insertion part 22b1 of the insertion hole 22b on the other side, the negative terminal member 50 made of copper is inserted, and it is fixed to the lid 22 via a resin member 70 insulating the negative terminal member 50 from the case 10.

These terminal members 40 and 50 are each produced by punching a metal plate (concretely, an aluminum plate for the positive terminal member 40 and a copper plate for the negative terminal member 50) into a predetermined shape and bending the metal plate. The terminal members 40 and 50 respectively include terminal outer flat-plate portions 41 and 51 located outside the lid 22 on an outer side EH, and terminal inner portions 42 and 52 mainly located inside the case 10 and respectively connected to the terminal outer flat-plate portions 41 and 51 via the insertion holes 22a and 22b. The terminal outer flat-plate portions 41 and 51 each have a rectangular flat plate-like shape, and include rectangular flat terminal top surfaces 41m and 51m, respectively. These terminal top surfaces 41m and 51m thus have no resin burrs and are each exposed entirely. The positive terminal inner portion 42 is joined and electrically conductive to a positive current collecting portion 33 of the electrode body 30, which will be described later, in the case 10. Meanwhile, the negative terminal inner portion 52 is joined and electrically conductive to a negative current collecting portion 36 of the electrode body 30, which will be described later, in the case 10.

Next, the resin members 60 and 70 will be described. The resin member 60 is joined to an annular insertion-hole surrounding portion 23 of the lid 22 surrounding the insertion hole 22a and the positive terminal member 40 while insulating between the insertion-hole surrounding portion 23 of the lid 22 and the terminal member 40, to fix the terminal member 40 to the lid 22. In addition, the resin member 70 is joined to an annular insertion-hole surrounding portion 24 of the lid 22 surrounding the insertion hole 22b and the negative terminal member 50 while insulating between the insertion-hole surrounding portion 24 of the lid 22 and the terminal member 50, to fix the terminal member 50 to the lid 22.

These resin members 60 and 70 are made of polyphenylene sulfide (PPS), and include resin outer frame portions 61 and 71 which are located outside the lid 22 on the outer side EH, and resin inner portions 62 and 72 which are located inside the case 10 and in the insertion holes 22a and 22b of the lid 22 and which are connected to the resin outer frame portions 61 and 71, respectively. The resin outer frame portion 61 has a frame shape that surrounds the outer periphery of the terminal outer flat-plate portion 41 of the positive terminal member 40 and is flush with the terminal top surface 41m of the terminal outer flat-plate portion 41. This resin outer frame portion 61 insulates between the terminal outer flat-plate portion 41 of the terminal member 40 and the insertion-hole surrounding portion 23 of the lid 22. Similarly, the resin outer frame portion 71 has a frame shape that surrounds the outer periphery of the terminal outer flat-plate portion 51 of the negative terminal member 50 and is flush with the terminal top surface 51m of the terminal outer flat-plate portion 51. This resin outer frame portion 71 insulates between the terminal outer flat-plate portion 51 of the terminal member 50 and the insertion-hole surrounding portion 24 of the lid 22. Meanwhile, the resin inner portion 62 insulates between the terminal inner portion 42 of the terminal member 40 and the lid 22, and the resin inner portion 72 insulates between the terminal inner portion 52 of the terminal member 50 and the lid 22.

Next, the electrode body 30 will be described. This electrode body 30 is produced in such a manner that a strip-shaped positive electrode plate 31 and a strip-shaped negative electrode plate 34 are stacked alternately so that a pair of separators 37, each composed of a strip-shaped porous resin film, are interposed one between the electrode plates 31 and 34, and this stacked assembly is wound into a cylindrical shape, and then pressed into a flat shape. The electrode body 30 is housed in the case 10 oriented sideways with its axis coinciding with the battery width direction BH. An end portion of the electrode body 30 on the one side BH1 in the battery width direction BH is the positive current collecting portion 33 in which a positive current collecting foil 32 of the positive electrode plate 31 protrudes in a spiral form. This positive current collecting portion 33 is joined to the terminal inner portion 42 of the positive terminal member 40. Another end portion of the electrode body 30 on the other side BH2 in the battery width direction BH is the negative current collecting portion 36 in which a negative current collecting foil 35 of the negative electrode plate 34 protrudes in a spiral form. This negative current collecting portion 36 is joined to the terminal inner portion 52 of the negative terminal member 50.

Figure 6:
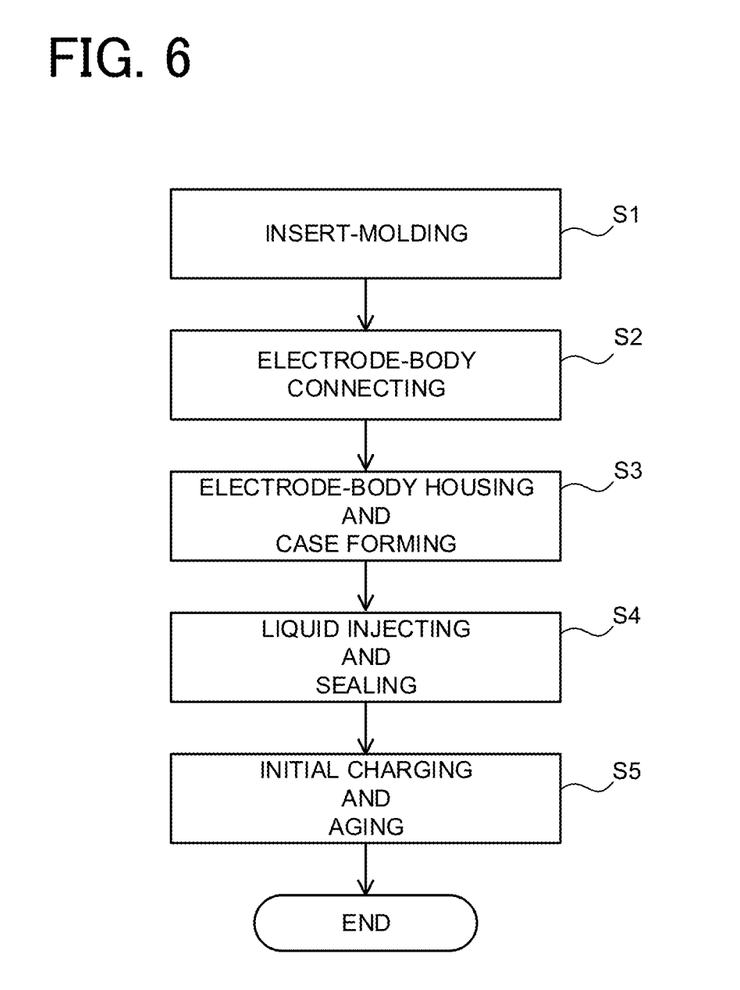
FIG. 6 is a flowchart showing a method for producing the battery in the embodiment.

Next, a method for producing the battery 1 will be described (see FIGS. 6 to 8). The lid 22 and the terminal members 40 and 50 are prepared in advance. Specifically, the lid 22 is obtained by punching an aluminum plate into a predetermined shape with the liquid inlet 22k, the insertion holes 22a and 22b, and the safety valve 28. In addition, the positive terminal member 40 is obtained by punching an aluminum plate into a predetermined shape and bending the aluminum plate, and similarly the negative terminal member 50 is obtained by punching a copper plate into a predetermined shape and bending the copper plate.

Figure 7:
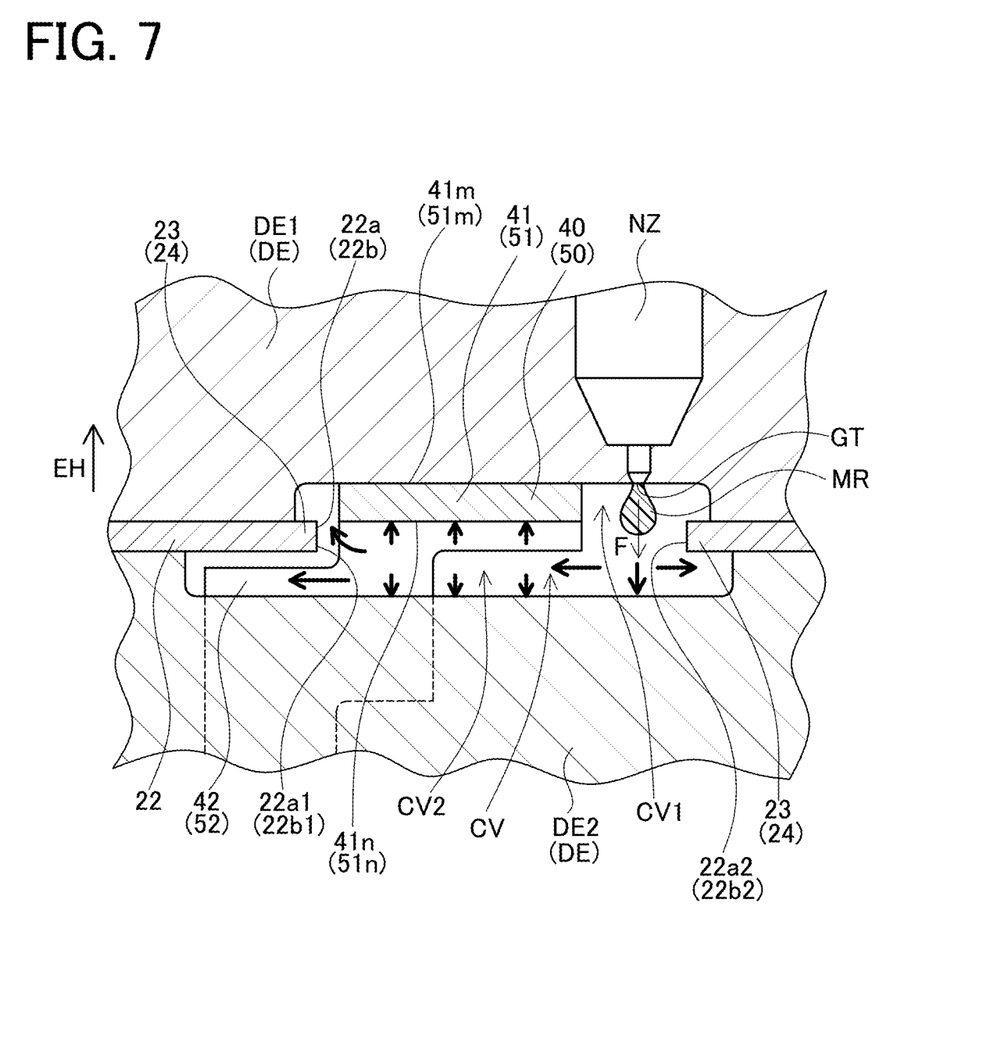
FIG. 7 illustrates a state where molten resin is injected through a gate into a cavity in an insert-molding step in the method for producing the battery in the embodiment.
Figure 8:
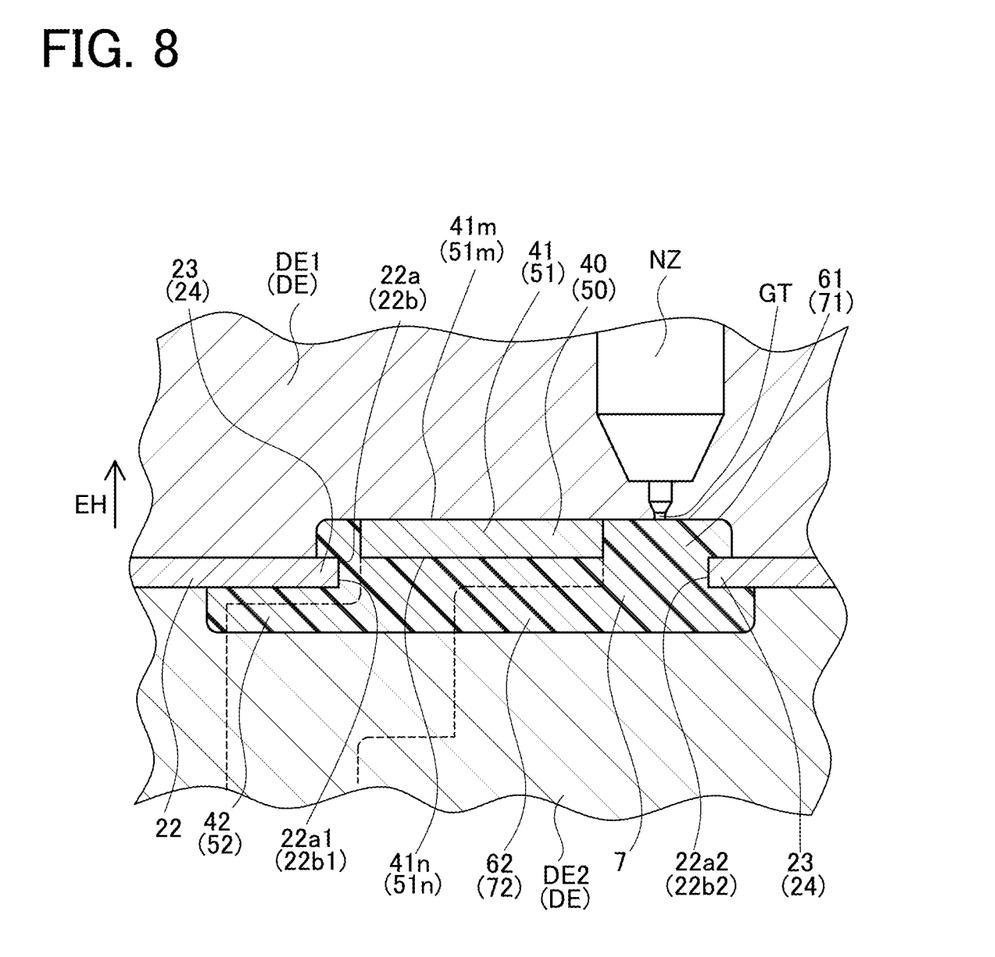
FIG. 8 illustrates a state where a resin member is formed in the cavity in the insert-molding step in the method for producing the battery in the embodiment.

Then, in an insert-molding step S1 (see FIG. 6), with the terminal members 40 and 50 inserted in the insertion holes 22a and 22b of the lid 22, respectively, the resin members 60 and 70 are made by insert-molding using a molding mold DE composed of an upper mold DE1 and a lower mold DE2 (see FIG. 7) to form a lid assembly 7 including the lid 22 integrated with the terminal members 40 and 50 (see FIGS. 7 and 8). Specifically, the lid 22 is placed at a predetermined position in the lower mold DE2. Subsequently, the terminal members 40 and 50 are respectively inserted into the insertion holes 22a and 22b of the lid 22 placed in the lower mold DE2. Then, the upper mold DE1 is moved downward and placed on the lower mold DE2 to close the molding mold DE.

In the upper mold DE1, a pair of injection nozzles NZ are installed. These nozzles NZ are each configured to inject molten resin MR through a gate GT formed at the tip end into each of cavities CV provided in a pair, one of which is defined by the lid 22, the terminal member 40, and the molding mold DE and the other of which is defined by the lid 22, the terminal member 50, and the molding mold DE. When the molding mold DE is in a closed state, the insertion holes 22a and 22b of the lid 22, concretely, the cutout 22a2 of the insertion hole 22a and the cutout 22b2 of the insertion hole 22b, are each positioned in front of, i.e., at a front position F facing, the corresponding gate GT; for example, just below the corresponding gate GT in the present embodiment.

Then, the molten resin MR is injected through each gate GT into a gate-side space CV1 in the cavity CV, located on a side close to the gate GT (i.e., on an upper side in FIG. 7) relative to the lid 22. Since the insertion holes 22a and 22b are provided respectively with the cutouts 22a2 and 22b2, the molten resin MR, which is injected through each gate GT and flows downward in each cavity CV, is allowed to flow into an opposite gate-side space CV2 located on the opposite side from each gate GT relative to the lid 22, through the cutouts 22a2 and 22b2 without being blocked or interrupted by the lid 22.

Thus, even when the resin pressure for injecting the molten resin MR is set low, the molten resin MR is allowed to smoothly spread over each entire cavity CV. Meanwhile, since the resin pressure can be set low, this can prevent a part of the molten resin MR supplied to the space around the terminal outer flat-plate portion 41 of the terminal member 40 or the space around the terminal outer flat-plate portion 51 of the terminal member 50 from flowing in between the terminal top surface 41m of the terminal outer flat-plate portion 41 and the upper mold DE1 or from flowing in between the terminal top surface 51m of the terminal outer flat-plate portion 51 and the upper mold DE1. The appropriate resin pressure of the molten resin MR depends on the design of a battery and therefore should be appropriately set by preliminary experiments.

The molten resin MR flowing into the opposite gate-side space CV2 in one of the cavities CV flows in under a terminal undersurface 41n of the terminal outer flat-plate portion 41 of the terminal member 40 and pushes the terminal undersurface 41n to press the terminal outer flat-plate portion 41 against the upper mold DE1, thus causing the terminal top surface 41m to tightly contact the upper mold DE1. Similarly, the molten resin MR flowing into the opposite gate-side space CV2 in the other cavity CV flows in under a terminal undersurface 51n of the terminal outer flat-plate portion 51 of the terminal member 50 and pushes the terminal undersurface 51n to press the terminal outer flat-plate portion 51 against the upper mold DE1, thus causing the terminal top surface 51m to tightly contact the upper mold DE1. Accordingly, the molten resin MR is effectively suppressed from flowing in between the upper mold DE1 and the terminal top surface 41m or from flowing in between the upper mold DE1 and the terminal top surface 51m.

Thereafter, the molten resin MR filled throughout the cavities CV is cooled, forming the resin members 60 and 70. In the present embodiment, the molten resin MR injected through the gates GT as described above smoothly spreads over the entire cavities CV. Thus, even when the molten resin MR is injected at a low resin pressure, the resin members 60 and 70 are formed without containing air bubbles. Meanwhile, such a resin pressure set low can prevent deformation of the insertion-hole surrounding portions 23 and 24 of the lid 22.

Subsequently, the upper mold DE1 is moved upward, and the lid assembly 7 composed of the lid 22 and the terminal members 40 and 50 fixed thereto via the resin members 60 and 70, respectively, is taken out of the lower mold DE2.

Next, in an electrode-body connecting step S2 (see FIG. 6), the electrode body 30 produced by winding the strip-shaped positive electrode plate 31, the strip-shaped negative electrode plate 34, and the strip-shaped separators 37, which are alternately stacked one on another, and pressing these wound electrode plates 31 and 34 and separators 37 into a flat shape, is prepared. Further, the terminal inner portions 42 and 52 of the terminal members 40 and 50 of the above-described lid assembly 7 are ultrasonically welded to the positive current collecting portion 33 and the negative current collecting portion 36 of the electrode body 30, respectively (see FIG. 1 and FIG. 2). Then, this electrode body 30 is enclosed in the bag-shaped insulating holder 5.

In an electrode-body housing and case forming step S3, the case body 21 is prepared, the electrode body 30 covered with the insulating holder 5 is inserted into this case body 21, and the opening portion 21c of the case body 21 is closed with the lid 22. Then, the opening portion 21c of the case body 21 and a peripheral edge portion of the lid 22 are laser-welded together over their entire circumference to complete the case 10 with the electrode body 30 housed therein.

In a liquid injecting and sealing step S4, the electrolyte 3 is injected into the case 10 through the liquid inlet 22k, so that the electrode body 30 is impregnated therewith. Then, the liquid inlet 22k is covered with the sealing member 29 from the outside, and the sealing member 29 is laser-welded to the lid 22 to hermetically seal between the sealing member 29 and the lid 22.

In an initial charging and aging step S5, a charging device (not shown) is connected to the battery 1, and initial charging is performed on the battery 1. Then, the initially charged battery 1 is allowed to stand for a predetermined time to age. Thus, the battery 1 is completed.

In the method for producing the battery 1, as described above, in the insert-molding step S1, the insertion holes 22a and 22b of the lid 22 are placed in the front positions F of the corresponding gates GT, the molten resin MR is injected through the gates GT to flow into the opposite gate-side spaces CV2 in the cavities CV through the insertion holes 22a and 22b, allowing the molten resin MR to spread throughout the cavities CV. The molten resin MR is thus smoothly spread over each entire cavity CV. Therefore, even when the resin pressure for injecting the molten resin MR is low, the resin members 60 and 70 are formed without containing air bubbles. Meanwhile, since the resin pressure can be set low, this can prevent deformation of the insertion-hole surrounding portions 23 and 24 of the lid 22. Consequently this method can produce the battery 1 with the resin members 60 and 70 containing no air bubbles and the lid 22 having been undeformed.

In the present embodiment, the insertion holes 22a and 22b provided in the lid 22 respectively include the insertion parts 22a1 and 22b1 through which the terminal members 40 and 50 are inserted respectively, and the cutouts 22a2 and 22b2 extending from the insertion parts 22a1 and 22b1 respectively. Therefore, the insertion holes 22a and 22b can be reduced in size as compared to an insertion hole whose overall shape is rectangular, elliptic, etc., and hence the resin members 60 and 70 can be formed with a reduced size. Even for the small insertion holes 22a and 22b and small the resin members 60 and 70 as above, the present method can produce the battery 1 with the resin members 60 and 70 containing no air bubbles and the lid 22 having been undeformed.

In the present embodiment, the resin pressure of the molten resin MR can be set low, thereby enabling to prevent a part of the molten resin MR supplied around each of the terminal outer flat-plate portions 41 and 51 to further flow in between the terminal top surface 41m of the terminal outer flat-plate portion 41 and the upper mold DE1 or between the terminal top surface 51m of the terminal outer flat-plate portion 51 and the upper mold DE1. Furthermore, the molten resin MR having flown into the opposite gate-side spaces CV2 in the cavities CV then flows in under the terminal undersurface 41n of the terminal outer flat-plate portion 41 or under the terminal undersurface 51n of the terminal outer flat-plate portion 51, respectively pushing the terminal undersurface 41n or 51n to press the terminal outer flat-plate portion 41 or 51 against the upper mold DE1, thus causing the terminal top surface 41m or 51m to tightly contact the upper mold DE1. This can effectively prevent the molten resin MR from additionally flowing even in between the upper mold DE1 and each of the terminal top surfaces 41m and 51m.

The foregoing embodiment is a mere example and gives no limitation to the present disclosure. The present disclosure may be embodied in other specific forms without departing from the essential characteristics thereof.

In the foregoing embodiment, for instance, in the insert-molding step S1, the insertion holes 22a and 22b of the lid 22 respectively formed with the cutouts 22a2 and 22b2 in advance are each placed so that the cutouts 22a2 and 22b2 of the insertion holes 22a and 22b are each located at the front position F facing the corresponding gate GT. As an alternative to this, for example, an insertion part, through which the terminal member 40 or 50 is inserted, may also be designed with a longer length in the battery width direction BH to have an increased size so that the insertion hole is placed at the front position F facing the gate GT.

REFERENCE SIGNS LIST

1 Battery (Power storage device)
10 Case
21 Case body
22 Lid (Case member)
22a, 22b Insertion hole
22a1, 22b1 Insertion part
22a2, 22b2 Cutout
30 Electrode body
40, 50 Terminal member
41, 51 Terminal outer flat-plate portion
41m, 51m Terminal top surface
41n, 51n Terminal undersurface
60, 70 Resin member
61, 71 Resin outer frame portion
EH Outer side (of Lid)
DE Molding mold
GT Gate
CV Cavity
CV1 Gate-side space
CV2 Opposite gate-side space
F Front position (facing a gate)
MR Molten resin

What is claimed is:

1. A method for producing a power storage device, the power storage device including:
    a case member including an insertion hole;
    a terminal member inserted in the insertion hole of the case member; and
    a resin member joined to the case member and the terminal member while insulating between the case member and the terminal member, to fix the terminal member to the case member,
    the method comprising:
        insert-molding the resin member in a state where the terminal member is inserted in the insertion hole of the case member,
        wherein insert-molding the resin member is performed using a molding mold by:
            placing the insertion hole of the case member in front of a gate through which molten resin is injected into a cavity defined by the case member, the terminal member, and the molding mold; and
            injecting the molten resin through the gate into the cavity, so that the molten resin flows, through the insertion hole, to an opposite gate-side space located on an opposite side from the gate relative to the case member, and spreads over the entire cavity to form the resin member.

2. The method according to claim 1, wherein
the insertion hole includes:
    an insertion part in which the terminal member is inserted; and
    a cutout extending from the insertion part, and
insert-molding the resin member is performed by placing the cutout of the insertion hole in the front of the gate.

3. The method according to claim 1, wherein
the terminal member includes a terminal outer flat-plate portion located outside the case member, the terminal outer flat-plate portion having a flat plate shape and including a planar terminal top surface, which is exposed outside, and
the resin member includes a resin outer frame portion located outside the case member and formed in a frame shape that surrounds an outer periphery of the terminal outer flat-plate portion of the terminal member and is flush with the terminal top surface of the terminal outer flat-plate portion.

4. The method according to claim 2, wherein
the terminal member includes a terminal outer flat-plate portion located outside the case member, the terminal outer flat-plate portion having a flat plate shape and including a planar terminal top surface, which is exposed outside, and
the resin member includes a resin outer frame portion located outside the case member and formed in a frame shape that surrounds an outer periphery of the terminal outer flat-plate portion of the terminal member and is flush with the terminal top surface of the terminal outer flat-plate portion.

5. The method according to claim 1, wherein injecting the molten resin at a pressure to avoid the molten resin occupying a space between an upper surface of the terminal member and the molding mold.

* * * * *